(12) United States Patent
Larchev et al.

(10) Patent No.: US 12,164,510 B2
(45) Date of Patent: Dec. 10, 2024

(54) PRESENTATION OF RELATED AND CORRECTED QUERIES FOR A SEARCH ENGINE

(71) Applicant: Home Depot Product Authority, LLC, Atlanta, GA (US)

(72) Inventors: Gregory Larchev, Atlanta, GA (US); Jared Moore, Atlanta, GA (US); Rongkai Zhao, Kildeer, IL (US); Felipe Castrillon, Atlanta, GA (US); Chao Wang, Smyrna, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 679 days.

(21) Appl. No.: 16/032,311

(22) Filed: Jul. 11, 2018

(65) Prior Publication Data

US 2020/0019632 A1 Jan. 16, 2020

(51) Int. Cl.
*G06F 16/242* (2019.01)
*G06F 16/951* (2019.01)
*G06N 3/044* (2023.01)
*G06N 3/08* (2023.01)

(52) U.S. Cl.
CPC .......... *G06F 16/242* (2019.01); *G06F 16/951* (2019.01); *G06N 3/044* (2023.01); *G06N 3/08* (2013.01)

(58) Field of Classification Search
CPC .. G06F 16/242; G06F 16/951; G06F 16/3325; G06F 16/3347; G06N 3/08; G06N 3/0445
See application file for complete search history.

(56) References Cited

U.S. PATENT DOCUMENTS

| 7,254,774 B2 | 8/2007 | Cucerzan et al. |
| 7,321,892 B2 | 1/2008 | Vadon et al. |
| 7,856,598 B2 | 12/2010 | Liao et al. |

(Continued)

FOREIGN PATENT DOCUMENTS

| CN | 104778234 A | 7/2015 |
| CN | 106649605 A | 5/2017 |
| JP | 200109282 A | 4/2001 |

OTHER PUBLICATIONS

ISA/US, International Search Report and Written Opinion issued in application No. PCT/US19/41189, Date of Mailing Oct. 9, 2019, 7 pgs.

(Continued)

*Primary Examiner* — Mariela Reyes
*Assistant Examiner* — Fernando M Mari Valcarcel
(74) *Attorney, Agent, or Firm* — Greenberg Traurig, LLP

(57) ABSTRACT

Systems and methods for providing suggestions responsive to search queries for a search engine are disclosed. Such suggestions may include one or more related search queries and/or a spell correction. Related search queries may be provided by converting the search query into a document vector space, determining documents that are similar to the query in the vector space, and determining prior search queries to which those similar documents are responsive. Spell corrections may be provided by comparing n-tuple word combinations in the search query to a library of correct n-tuple word combinations and making appropriate corrections.

20 Claims, 6 Drawing Sheets

(56) References Cited

U.S. PATENT DOCUMENTS

| | | | |
|---|---|---|---|
| 8,019,742 B1* | 9/2011 | Baluja | G06F 16/3325 |
| | | | 707/706 |
| 9,594,851 B1 | 3/2017 | Chechik | |
| 2003/0069873 A1 | 4/2003 | Fox et al. | |
| 2007/0130123 A1* | 6/2007 | Majumder | G06F 16/3347 |
| 2012/0284275 A1* | 11/2012 | Vadrevu | G06F 16/358 |
| | | | 707/738 |
| 2013/0346434 A1 | 12/2013 | Shazeer | |
| 2014/0229473 A1* | 8/2014 | Mehrotra | G06F 16/3347 |
| | | | 707/728 |
| 2016/0259857 A1 | 9/2016 | Wang et al. | |
| 2017/0124447 A1* | 5/2017 | Chang | G06F 16/3334 |
| 2017/0200066 A1 | 7/2017 | Wang et al. | |
| 2018/0068023 A1* | 3/2018 | Douze | G06F 16/9535 |
| 2018/0225274 A1* | 8/2018 | Tommy | G06F 40/232 |

OTHER PUBLICATIONS

Francois Chaubard et al., CS 224D: Deep Learning for NLP, Spring 2016, 10 pgs.

Free Grammar Checker, Grammarly, Your writing, at its best., Dec. 9, 2017, https://www.grammarly.com/, 6 pgs.

Jia Pan et al., Fast GPU-based Locality Sensitive Hashing for K-Nearest Neighbor Computation, 10 pgs.

Marius Muja, et al., Scalable Nearest Neighbor Algorithms for High Dimensional Data, IEEE Transactions on Pattern Analysis and Machine Intelligence, vol. 36, No. 11, Nov. 2014, 14 pgs.

* cited by examiner

PRESENTATION OF RELATED AND CORRECTED QUERIES FOR A SEARCH ENGINE

FIELD OF THE DISCLOSURE

This disclosure is generally directed to determining and presenting search queries that are related to, or a corrected version of, a search query provided by a user for an electronic document search engine.

BACKGROUND

In electronic document search engines, it is generally known to receive a search query from a user, search a given set of electronic documents (e.g., a private database of documents or publicly-available documents on the internet, or a subset thereof), and return a listing of responsive documents to a user. Various methods are known for suggesting similar search queries to a user, or for correcting a user's search query.

SUMMARY

An example method of recommending similar searches in an electronic document search engine may include receiving a current search query from a user, the current search query intended for the search engine, converting the current search query into one or more word vectors, converting the one or more word vectors into a document vector with a machine learning model, the machine learning model trained on a set of pairs, each pair comprising (i) a respective prior search query, each comprising one or more word vectors and (ii) a composite vector describing a respective document that is searchable by the search engine and is responsive to the respective prior search query, applying a locality-sensitive hashing algorithm to the document vector to determine one or more of the composite vectors that are closest to the document vector, and recommending to the user, responsive to the current search query, the prior search queries to which the closest composite vectors are responsive.

In an embodiment of the method, the machine learning model may be a recurrent neural network.

In an embodiment of the method, the set of pairs may be based on user data in the search engine, wherein each pair comprises (i) a respective prior search query input by a user in the search engine and (ii) a respective composite vector describing a respective document that was returned by the search engine and selected by the user responsive to the respective prior search query.

In an embodiment of the method, the search query may be received through a search interface for the search engine, and the method may further include recommending the prior search queries comprises recommending the prior search queries proximate the search interface.

In an embodiment of the method, each composite vector may comprise a feature vector model portion based on one or more features of an entity that are included in the respective document, a description vector model portion calculated based on a narrative description of the entity that is included in the respective document, and an image vector model portion based on an image of the entity that is included in the respective document.

In an embodiment of the method, the method may further include determining that the current search query includes a spelling error, and determining a corrected current search query by correcting the spelling error, wherein converting the current search query into one or more word vectors comprises converting the corrected current search query into one or more word vectors. In an embodiment of the method, determining that the current search query includes a spelling error may include comparing the current search query to a library of n-tuple word mappings. In an embodiment of the method, the prior search queries included in the set of pairs may comprise a first set of prior search queries, and the library of n-tuple word mappings may comprise a second set of prior search queries comprising a plurality of properly-spelled search queries.

In an embodiment of the method, the method may further comprise training the machine learning model on the set of pairs.

In an embodiment of the method, the method may further include receiving, from the user, a selection of one of the prior search queries, executing a search with the search engine on the user-selected prior search query, and returning a set of documents to the user that are responsive to the user-selected prior search query.

An example system may include a processor and a memory storing instructions that, when executed by the processor, cause the system to perform a method including receiving a current search query from a user, the current search query intended for the search engine, converting the current search query into one or more word vectors, converting the one or more word vectors into a document vector with a machine learning model, the machine learning model trained on a set of pairs, each pair comprising (i) a respective prior search query, each comprising one or more word vectors and (ii) a composite vector describing a respective document that is searchable by the search engine and is responsive to the respective prior search query, applying a locality-sensitive hashing algorithm to the document vector to determine one or more of the composite vectors that are closest to the document vector, and recommending to the user, responsive to the current search query, the prior search queries to which the closest composite vectors are responsive.

In an embodiment of the system, the machine learning model may be a recurrent neural network.

In an embodiment of the system, the set of pairs may be based on user data in the search engine, wherein each pair comprises (i) a respective prior search query input by a user in the search engine and (ii) a respective composite vector describing a respective document that was returned by the search engine and selected by the user responsive to the respective prior search query.

In an embodiment of the system, the search query may be received through a search interface for the search engine, and recommending the prior search queries may comprise recommending the prior search queries proximate the search interface.

In an embodiment of the system, each composite vector may comprise a feature vector model portion based on one or more features of an entity that are included in the respective document, a description vector model portion calculated based on a narrative description of the entity that is included in the respective document, and an image vector model portion based on an image of the entity that is included in the respective document.

In an embodiment of the system, the method may further comprise determining that the current search query includes a spelling error, and determining a corrected current search query by correcting the spelling error, wherein converting the current search query into one or more word vectors comprises converting the corrected current search query into one or more word vectors. In an embodiment of the system, determining that the current search query includes a spelling error may comprise comparing the current search query to a library of n-tuple word mappings. In an embodiment of the system, the prior search queries included in the set of pairs may comprise a first set of prior search queries, and the library of n-tuple word mappings may comprise a second set of prior search queries comprising a plurality of properly-spelled search queries.

In an embodiment of the system, the method may further comprise training the machine learning model on the set of pairs.

In an embodiment of the system, the method may further comprise receiving, from the user, a selection of one of the prior search queries, executing a search with the search engine on the user-selected prior search query, and returning a set of documents to the user that are responsive to the user-selected prior search query.

DETAILED DESCRIPTION

Figure 1:
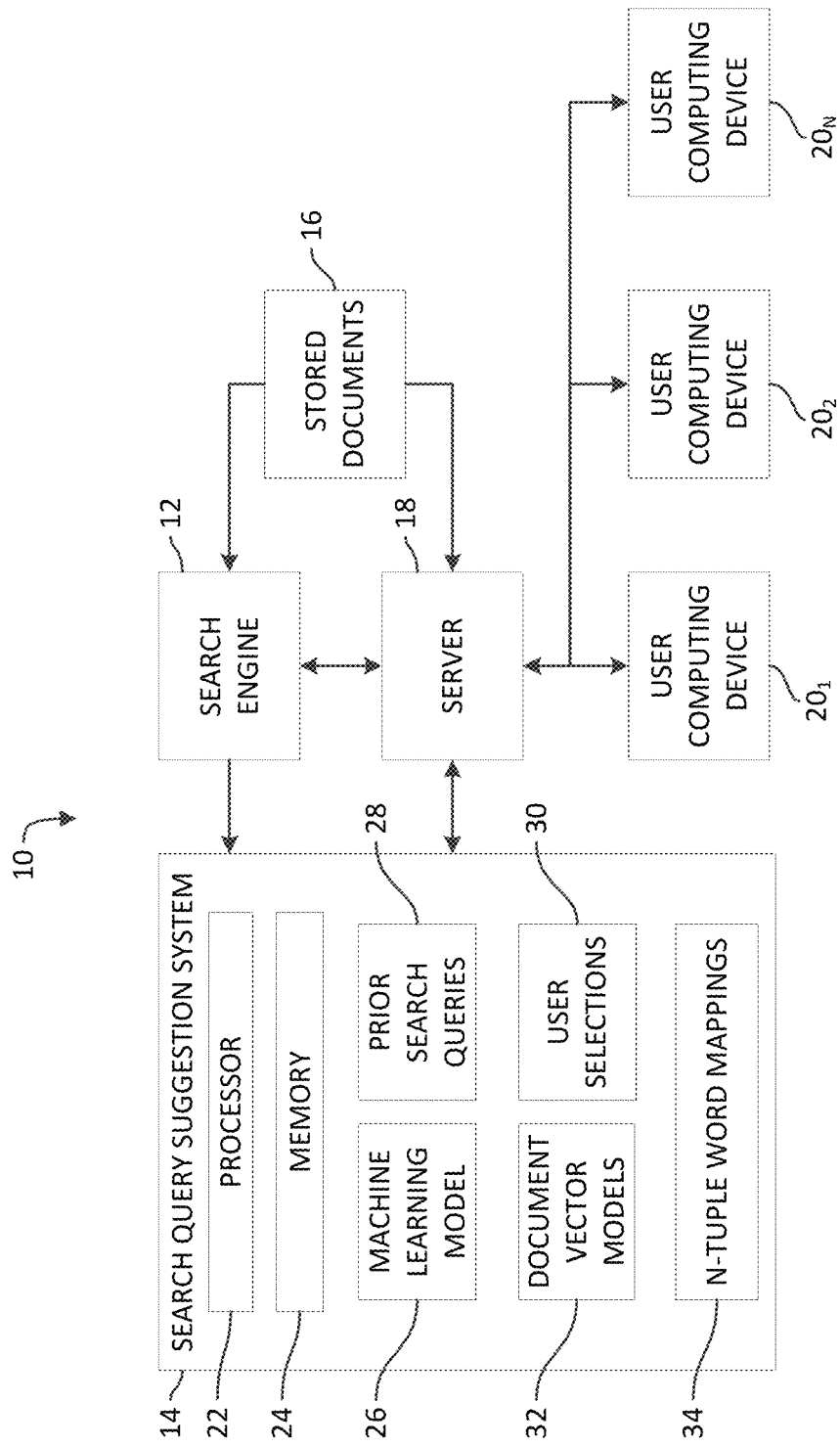
FIG. 1 is a diagrammatic view of an example system for operating a search engine for computer-readable documents and providing an associated search engine interface.

In response to entry and/or submission of a search query by a user that is intended for an electronic document search engine, various responses (in addition to the search results themselves) may be provided to the user to improve the quality of the search query, and thereby improve the quality of the search results.

A first kind of response that may be provided is a recommendation of one or more search queries that are similar to the user-entered or user-submitted search query. For example, search queries that are similar to the user-entered query may be provided under the search interface (e.g., search bar where the user has provided the search query) before or after performing the search, or at the bottom of the search results after the search query is submitted and the search is performed with a search engine. For example, such similar queries may be more common queries than the user-entered query, or may be more semantically similar to categories of documents available to the search engine than the user-entered query, and thus the search engine may be configured, based on past user data and/or document categorization, to provide higher-quality results in response to such similar queries than it would to less common search queries.

In the e-commerce space, recommending related search queries to customers can significantly increase user engagement and revenue. Related searches can help to keep customers engaged in different ways. For example, if a user does not find a relevant product or service in response to the user's original search query, the user may want to try a suggested similar search to attempt to find such a relevant service or product. Or if the user finds that one of the related queries more closely matches the intent of the original search query, the user can make use of that recommended related search query.

Common algorithms for related search recommendations generally rely only on previously-observed user data respective of a user's entered search query. These methods may work well for popular search queries for which a large quantity of historical data exists. In some search engine contexts, however, a significant number (e.g., a majority) of search queries may consist of "tail queries," or queries that are only observed a small number of times. For example, for a given search engine, a tail query may be a query that has been submitted by users ten times or fewer, or five times or fewer. Accordingly, uncommon search queries may comprise a significant percentage of a given search engine's search volume, and known algorithms for determining related search recommendations may not function properly. In an e-commerce context, targeting related searches for tail queries may provide great value because tail queries usually lead to low customer conversion rates.

As will be described in greater detail in this disclosure, an inventive methodology for operating an electronic document search engine to provide related search queries responsive to a user-entered search query may include converting a plurality of previous search queries (e.g., common search queries) into a document vector space (e.g., using a machine learning model). At runtime, the user's search query may also be converted into the document vector space, and the search queries having document vectors similar to the current search query may be considered "similar" to the current query and may be suggested to the user. Providing related search queries according to the present disclosure may provide a technology-centric solution to a problem that arises uniquely for electronic document search engines, namely, improvement of search queries for which the search engine is not optimized.

A second kind of response that may be provided to entry or submission of a user search query is an identification and/or correction of a misspelling in the user search query. Various known methods exist for electronic spell checking and correction. For example, the Aspell and Hunspell spell checking algorithms generally use a dictionary check and supply suggestions based on lowest edit distance. These approaches cannot solve any errors when all of the words are spelled correctly, but in a combination that is incorrect (e.g., "kitchen facet" instead of "kitchen faucet").

Another known spell check approach may utilize a bigram/n-gram/skip-gram model with phonetic matching and part-of-speech tagging. This approach may use information about the words in the query (part-of-speech, pronunciation, etc.) to determine how likely it is that a given combination of terms is valid, and may also use some sort of index, such as Lucene, for better performance. Due to its complexity, this approach may be relatively computationally expensive, and thus may be relatively slow if insufficient computing power is dedicated to spell checking for user search queries.

Yet another known spell checking approach may use a deep neural network. Some neural network-based approaches may provide generally high-quality results, but may not make use of a dictionary and, due to the black-box nature of a neural network after training, may provide corrections that are not, in fact, correct. In addition, neural network-based approaches may also be relatively computationally expensive, and thus may be relatively slow if insufficient computing power is dedicated to spell checking user queries.

An improved methodology, as described below, for determining and correcting misspellings may include creation of a plurality of n-tuple word mappings (e.g., bigrams, trigrams, etc.), checking search queries against those word mappings for validity, and checking individual words in search queries against a dictionary for proper spellings.

The improved approaches for recommending related searches responsive to a search query and/or correcting spelling of a search query will be described in detail with in conjunction with the figures below. First, with respect to FIG. 1 and FIG. 2, a system for operating a search engine according to the present disclosure, and a method for such operation, will be described. Specific aspects of the methodologies of the present disclosure will be described with respect to FIGS. 3-7. Finally, in conjunction with FIG. 8, various aspects of a computing environment that may find use with the present disclosure will be described.

The remainder of this disclosure will describe embodiments in which a search engine executes on the products and services available from an e-commerce retailer (and thus wherein the documents searched and returned by the search engine describe respective products and services offered by that retailer), but it should be understood that the teachings of the present disclosure may find use with search engines in a wide variety of contexts, including documents not particularly associated with any product or service.

FIG. 1 is a diagrammatic view of an example system 10 for operating a search engine for computer-readable documents and providing an associated search engine interface. The system 10 may find use, for example, with a search engine that searches for products and services on an e-commerce website. Accordingly, the documents searched and returned by the search engine may be listing pages for respective products or services, in some embodiments. The system 10 may include a search engine 12, a search query suggestion system 14, a plurality of stored electronic documents (e.g., source documents for web pages) 16, a web server 18, and a plurality of user computing devices $20_1$, $20_2$, ... $20_N$ (which may be referred to individually herein as a user computing device 20 or collectively as user computing devices 20).

The stored electronic documents 16 may include a plurality of source documents for web pages that may be provided as respective parts of a single web site (e.g., hosted under the same domain), such as an e-commerce website respective of a particular retailer, in some embodiments. For example, the stored electronic documents 16 may include a plurality of product or service source documents, each associated with a respective product or service, which may be used to create product information pages and similar web pages. Additionally or alternatively, the stored electronic documents 16 may include source documents for web pages not associated with any particular product or service. Additionally, in some embodiments, the stored electronic documents 16 may include source documents for web pages associated with a plurality of different web sites.

The search engine 12 may be configured to receive a search query originating from a user computing device 20, search a plurality of computer-readable documents, and return a listing of documents responsive to the search query. For example, the search engine 12 may be configured to search product source documents in the stored documents 16, responsive to a user search query, and return a listing the documents that are responsive to the request for provision to the requesting user computing device 20. In an embodiment, the search engine 12 may receive the search query from or through the server 18, and may provide responsive results to or through the server 18 for inclusion on a search results web page.

The server 18 may be in electronic communication with the user computing devices 20 and may provide one or more websites for access by one or more user computing devices 20. For example, the server 18 may serve an e-commerce website, in some embodiments. The one or more websites served by the server 18 may include web pages based on some or all of the documents 16, in an embodiment. A website served by the server 18 (e.g., one or more web pages thereof) may include a search interface for receiving search queries from one or more users through the user computing devices 20, and may further provide responsive results to the user computing devices 20. The server may thus be in electronic communication with the search engine and may provide search queries received from user computing devices 20 to the search engine 12 and receive responsive results from the search engine 12. The server may be configured to provide certain suggestions in or near a search interface, such as related search queries and/or spelling corrections, as described herein.

The search query suggestion system 14 may be configured to provide one or more suggestions to a user responsive to user input of a search query. That is, the search query suggestion system 14 may receive a search query (e.g., via the server 18) that originated at a user computing device 20, and may provide one or more responsive suggestions to the user computing device 20 (e.g., via the server 18). In some embodiments, the search query suggestion system may provide one or more responsive suggestions to the server 18 and/or an instruction to include such responsive suggestions in particular portions of an interface provided by the server 18. Such responsive suggestions may include a spell correction and/or one or more similar search queries, in some embodiments. The search query suggestion system 14 may include a processor 22 and a memory 24 storing instructions that, when executed by the processor 22, cause the search query suggestion system 14 to perform one or more of the steps, processes, or methods of this disclosure. In some embodiments, the search query suggestion system 14 may perform one or more of the steps, processes, or methods of this disclosure in conjunction with one or more other components of the system 10, such as the search engine 12 and/or server 18, and/or other systems or components.

The search query suggestion system 14 may be configured to train, store, and apply a machine learning model 26 that receives, as input, one or more word vectors that characterize a search query and to output a document vector that characterizes an electronic document responsive to that search query. The search query suggestion system 14 may be further configured to receive a user search query and to convert the search query into the one or more word vectors. The search query suggestion system 14 may be further configured to receive a user search query and make one or more responsive suggestions such as, for example, a spell correction and/or a related search query. An example method of providing a related search query will be described with reference to FIG. 3, and an example method of providing a spell correction will be described with respect to FIG. 7.

The search query suggestion system may further include a stored set of n-tuple word mappings 34. The n-tuple word mappings 34 may include a plurality of word combinations that have been entered in search queries for the search engine 12. The n-tuple word mappings 34 may include a plurality of bigrams, a plurality of trigrams, and/or a plurality of n-tuple word combinations of another length. The word combinations stored in the mappings 34 may be correctly spelled, and may be correct combinations.

The search query suggestion system 14 may be configured to perform a spell check and correction process for user search queries. The search query suggestion system 14 may compare word combinations in a user search query to the word combinations in the n-tuple word mappings 34 to determine if the combinations of words in the search query are valid, and/or may perform other spell check and correction operations. An example method of identifying and correcting misspellings in a search query will be described with reference to FIG. 7.

With continued reference to FIG. 1, the search query suggestion system 14 may include a set of prior search queries 28 (e.g., prior user queries from user computing devices 20) conducted with the search engine 12, and a set of user selections 30 of documents in search results that were responsive to those prior search queries 28, or to at least some of the prior user search queries 28. In some embodiments, the prior search queries 28 may include two sets of user queries: a first set that is paired with user selections 30, and a second set that is not paired with user selections 30. The first set of prior search queries 28, and the associated user selections 30, may be used to train the machine learning model 26, in some embodiments, for use on further search queries. The first and second set of prior search queries 28 may be used as sources of search request recommendations, in embodiments. The search query suggestion system 14 may store the prior search queries 28 and user selections 30 in associated pairs, such that the search query suggestion system stores an association between a given user selection and the search query to which that selection was responsive. In some embodiments, the user selections 30 may include the full set—or a portion thereof—of the search results responsive to the relevant prior search queries 28, including both documents that were ultimately selected by users, and documents that were not.

The search result ranking system 14 may further include a set of document vector models 32. In an embodiment, the document vector models 32 may include at least one vector model for each of a plurality of the documents 16. The document vector models 32 may be used by the machine learning model 26 for determining similar search queries, as will be described below. An example method for calculating a document vector model will be described with respect to FIG. 5.

As illustrated in FIG. 1, the search engine 12, search query suggestion system 14, stored documents 16, and server 18 may be embodied in separate computing resources (e.g., processing and memory resources), in some embodiments. In other embodiments, any two or more of the search engine 12, search query suggestion system 14, stored documents 16, and server 18 may be embodied in the same, or some of the same, computing resources. Further, in some embodiments, any one of the search engine 12, search query suggestion system 14, stored documents 16, or server 18 may be embodied in multiple disparate sets of computing resources.

Figure 2:
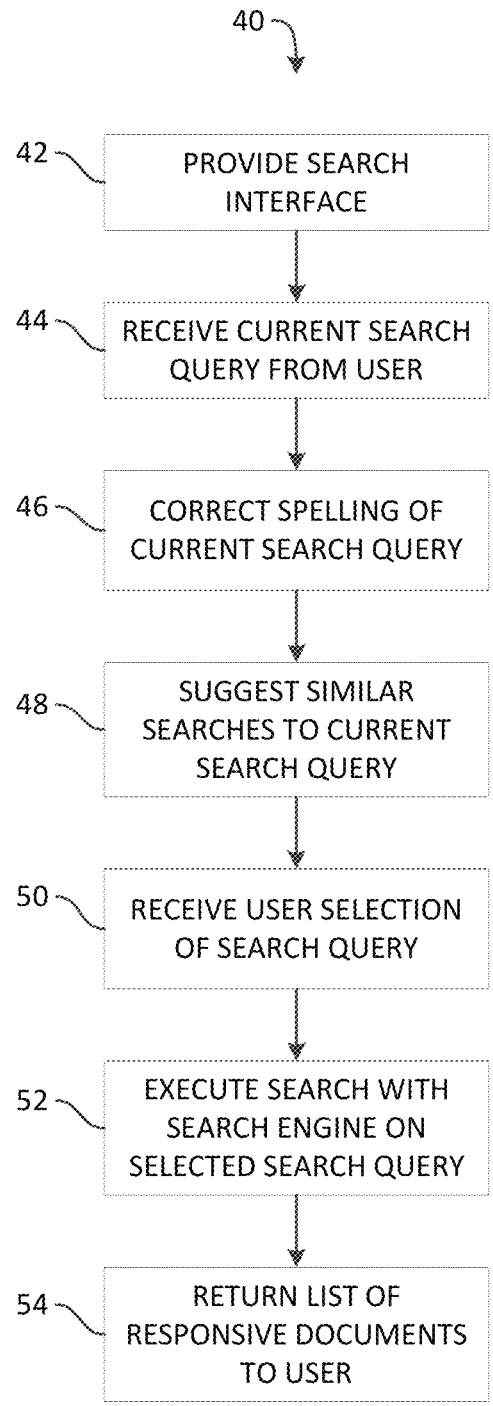
FIG. 2 is a flow chart illustrating an example method for operating a search engine for computer-readable documents and providing an associated search engine interface.

FIG. 2 is a flow chart illustrating an example method 40 for operating a search engine for computer-readable documents and an associated search engine interface. The method may be applied, for example, by the system 10 of FIG. 1. The method, or portions thereof, may be performed during a user's search on a website provided by the server 18, for example. In some embodiments, some or all aspects of the method may be performed during a user's search for products of services on an e-commerce website provided by the server 18.

The method 40 may include a step 42 that includes providing a search interface. The search interface may be provided in a website interface or other electronic interface, for example. The search interface may include a search bar or other entry portion in which a user may enter a search query, in an embodiment. The search interface may accept the search query in the form of text, in some embodiments. The search interface may additionally include options for searching by category, by field, and/or other search query options. The search interface may further include a user submission button, or other control element, through which a user may submit a search query for a search engine. The search interface, and/or the website or webpage on or in which the search interface is provided, may be configured for providing suggestions to a user responsive to text entry by a user (e.g., entry of a search query) without loading a new webpage or refreshing the webpage, in an embodiment.

The method 40 may further include a step 44 that includes receiving a current search query from a user. The current search query may be received through the search interface provided in step 42, in some embodiments. The current search query may be received when the user enters the search query into the search interface. Additionally or alternatively, the current search query may be received when the user submits the search query for the search engine. The current search query may comprise one or more words and/or numbers, in an embodiment. The current search query may be an uncommon query (e.g., a tail query), in some embodiments. In other embodiments, the current search query may be a common search query.

The method 40 may further include a step 46 that includes correcting the spelling of the current search query. An example method of correcting the spelling of a search query will be described with reference to FIG. 7. Briefly, the spell correction step 46 may include comparing one or more n-tuple word combinations in the current search query (e.g., bigrams, trigrams, etc.) to a stored list of n-tuple word mappings (e.g., the word mappings 34 of FIG. 1). If an n-tuple word combination in the search query is not found in the stored listing of n-tuple word mappings, it may be corrected to one of the n-tuples in the stored word mappings. The spell correction step may further include correcting the spelling of single words within the current search query based on a dictionary or other known method.

In some embodiments, the spell correction may be provided before the user submits the search query, in some embodiments—i.e., after the user has entered the search query (or a portion thereof) in the search interface, but before the user has submitted the search query for the search engine. In other embodiments, the spell correction may be provided in response to the user's submission of the search query.

The spell correction step 46 may include, for example, providing one or more suggested spell corrections to the user in or adjacent to the search interface. The suggested spell correction may be automatically inserted into the search interface (that is, the user's search query may be automatically corrected in the search interface), or the suggested spell correction may be presented to the user as a selectable option in or adjacent to the search interface.

The method 40 may further include a step 48 that includes suggesting one or more similar search queries to the current search query. Similar search queries may be suggested based on the original current search query (e.g., as entered by the user), or based on a spell-corrected version of the current search query (e.g., resulting from step 46). An example method of suggesting one or more similar search queries will be described with reference to FIG. 3.

In some embodiments, the similar search queries may be provided before the user submits the search query, in some embodiments—i.e., after the user has entered the search query (or a portion thereof) in the search interface, but before the user has submitted the search query for the search engine. In other embodiments, the similar search queries may be provided in response to the user's submission of the search query.

The similar search queries step 48 may include, for example, providing one or more similar search queries to the user in or adjacent to the search interface. For example, the suggested similar search queries may be presented to the user as selectable options in or adjacent to the search interface.

The method 40 may further include a step 50 that includes receiving a user selection of a search query. In some embodiments, receiving a user selection of a search query may include receiving a selection of the current search query (received in step 44) or of one of the suggested search queries (provided in step 48). For example, a user may select a search query by clicking on the current search query or on one of the similar search queries, responsive to which the user-selected search query may be populated in the search interface, in some embodiments.

The method 40 may further include a step 52 that includes executing the user's selected search query with a search engine. For example, the system or computing device providing the search interface (e.g., the server 18) may transmit the user's selected search query to a search engine (e.g., the search engine 12), may cause the search engine to perform the search according to the search query, and may receive the search results back from the search engine.

The method 40 may further include a step 54 that includes returning a list of responsive documents, e.g., the search results, to the user. The list of responsive documents may be generated by the search engine, and may be provided by a server to the user (e.g., in a web page with links to the responsive documents).

Figure 3:
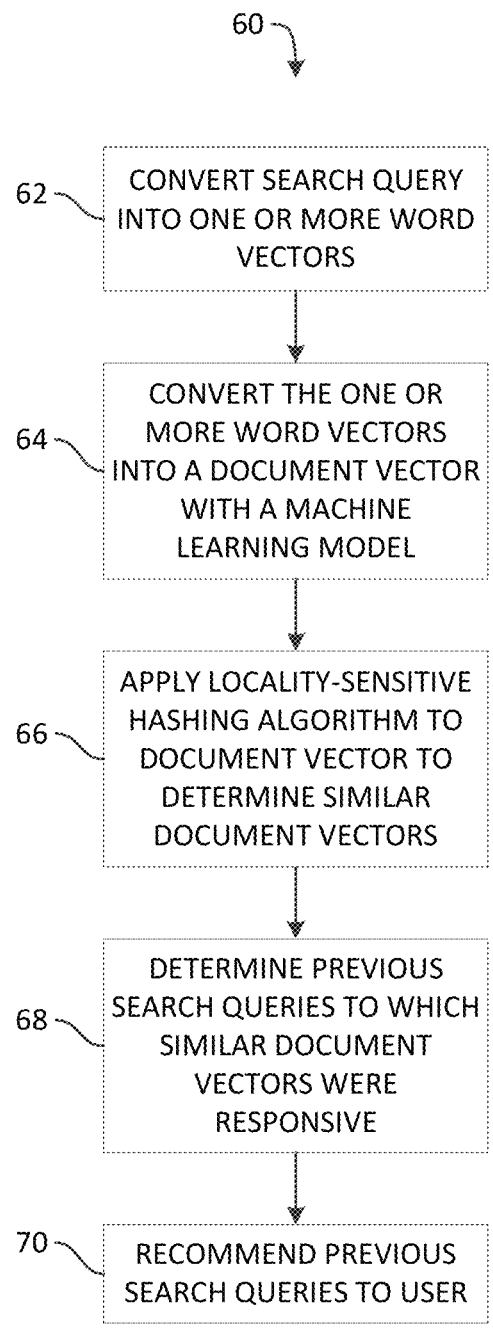
FIG. 3 is a flow chart illustrating an example method for determining and recommending search queries to a user that are similar to a user-entered search query.

FIG. 3 is a flow chart illustrating an example method 60 for determining and recommending search queries to a user that are similar to a user-entered search query. Referring to FIG. 1, the method, or portions thereof, may be performed by a search query suggestion system 14. As noted above, the method may find use in step 48 in the method 40 of FIG. 2. Accordingly, the method 60 of FIG. 3 will be described with reference to a search query that has been received from a user (e.g., entered with a user computing device and received by or through a server, for example).

The method 60 may include a step 62 that includes converting the search query into one or more word vectors. The search query may be converted into one or more word vectors by, for example, applying a vectorization algorithm that creates a word vector for each word in the search query, where the vectorization algorithm creates word vectors such that similar words are located near each other in the vector space. For example, one known vectorization algorithm is Word2Vec.

The method 60 may further include a step 64 that includes converting the one or more word vectors into a document vector with a machine learning model. For example, in an embodiment, the one or more word vectors may be input to a machine learning model which may output a document vector. The machine learning model may be a recurrent neural network, in some embodiments. In other embodiments, the machine learning model may be another type of neural network or other machine learning model type.

The machine learning model may have been trained to convert one or more word vectors into a document vector based on historical user data. For example, the machine learning model may have been trained on word vectors that correspond to past user search queries (e.g., search queries for a search engine) and on document vectors that correspond to electronic documents (e.g., source documents for product or service web pages) that are or were responsive to those past user search queries. An example method of training a machine learning model will be described with reference to FIG. 6.

The method 60 may further include a step 66 that includes applying a locality-sensitive hashing (LSH) algorithm to the document vector created at step 64 to determine similar document vectors. As a predicate to determining similar document vectors at step 66, respective document vectors may be determined for a plurality of documents. An example method of determining a document vector for each of a plurality of documents will be described with respect to FIG. 4. Accordingly, the similar document vector step 66 may make use of a stored set of document vectors (e.g., the document vector models 32 of FIG. 1) respective of a set of documents (e.g., the documents 16 of FIG. 1) that are stored or are otherwise accessible to the search engine.

In an embodiment, the step 66 of determining similar document vectors may result in respective categorization or classification of each of a plurality of document vectors respective of a plurality of documents accessible to the search engine, as well as of the document vector respective of the current search query that was created at step 64. As noted above, an LSH algorithm may be used for this classification or categorization. As a result of the classification or categorization step 66, the document vector respective of the current search query may share a classification or categorization with one or more document vectors respective of one or more documents. As a result of the classification or categorization step, the document vector respective of the current search query may be considered similar to one or more document vectors respective of one or more documents.

The method 60 may further include a step 68 that includes determining one or more previous search queries to which the similar document vectors determined in step 66 were or are responsive. The determining previous search queries step 68 may make use of a stored set of previous user search queries (e.g., the prior user search queries 28 of FIG. 1). The stored document vectors may be previously associated with previous search queries, in some embodiments. For example, the stored document vectors may be respective of documents that are responsive to the prior user searches (e.g., based on user selections, such as the user selections 30 of FIG. 1).

The method 60 may further include a step 70 that includes recommending the previous search queries determined at step 68 to the user. The previous search queries may be presented to the user in a search interface, as noted above.

The method 60 advantageously improves upon known methods for determining similar search queries because no data specific to the current user search query is required. Instead, by converting the current user search query into the document vector space—which may be well-populated with vectors respective of documents responsive to previous searches—the method 60 may utilize a broad amount of available information to provide similar searches for uncommon queries (e.g., tail queries) in an efficient and effective manner.

Figure 4:
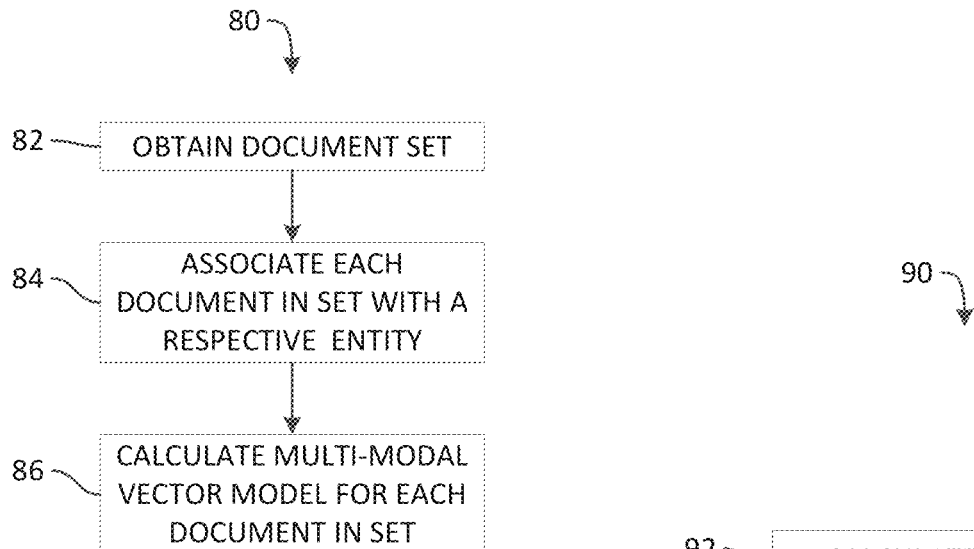
FIG. 4 is a flow chart illustrating an example method of preparing a set of computer-readable documents for search results from a search engine.

FIG. 4 is a flow chart illustrating an example method 80 of determining a document vector for each of a plurality of computer-readable documents. The method 80 may be performed, in some embodiments, in order to create a set of document vectors respective of a set of documents accessible to a search engine. For example, referring to FIG. 1, the method 80 may be performed in order to create the document vector models 32 respective of the stored documents 16.

The method 80 may include a step 82 that includes obtaining a document set. The document set may be or may include, for example, source documents for one or more web pages. The document set may be or may include, for example, source documents for one or more product information pages or service information pages on an e-commerce website. The document set may be or may include the stored documents 16 of FIG. 1, in an embodiment.

The method 80 may further include a step 84 that includes associating each document in the document set with a respective entity. For example, in an embodiment in which the documents include source documents for one or more product information pages or service information pages, the product information page source documents may be associated with the respective products listed, and the service information page source documents may be associated with the respective services listed. Accordingly, each product information page source document may be associated with a single product, and each service information page source document may be associated with a single service, in an embodiment. Associations between documents and entities may be inherent in the documents, in an embodiment, such as through the presence of information about a particular entity on the document.

The method 80 may further include a step 84 that includes calculating a composite vector model for each document in the set. An example method for determining a composite vector model for a single document will be described with respect to FIG. 5. The calculating step 86 may further include storing the vector models, in some embodiments.

Figure 5:
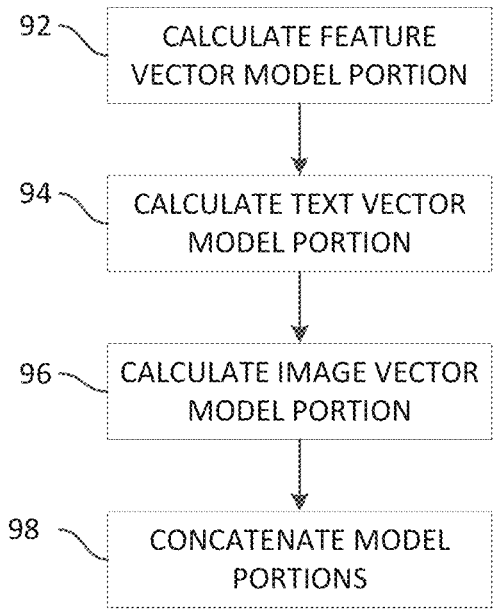
FIG. 5 is a flow chart illustrating an example method of calculating a composite vector model for a document.

FIG. 5 is a flow chart illustrating an example method 90 of calculating a composite vector model for a single document. In an embodiment, a composite vector may be calculated for each of a plurality of documents searchable by a search engine. For example, in an embodiment, a composite vector model may be calculated for each of a plurality of product information page source documents and/or service information page source documents on an e-commerce website.

The method 90 may include a step 92 that includes calculating a feature vector model portion. The feature vector model portion may include calculating a vector based on one or more features of an entity associated with the document. For example, the feature vector model portion may be calculated based on one or more features that are set forth in the document itself. Additionally or alternatively, the feature vector model may be calculated based on a separately-stored and separately-cataloged set of features respective of an entity associated with the document. For example, in an embodiment in which the document is associated with a single product, the feature vector model may be calculated based on a set of features respective of the product (e.g., height, width, weight, color, etc.) listed on the document and/or stored in a product database separate from the document. For example, in some embodiments, each feature may be reduced to a single number, and thus a vector may be created for each document that is equal in length to a respective number of features of the product associated with the document.

The method 90 may further include a step 94 that includes calculating a text vector model portion. The text vector model portion may be calculated based on one or more aspects of the text content of the document, such as the title and/or a description of an entity in the document, in an embodiment. In some embodiments, two or more text vector model portions may be calculated for respective text portions, such as a first vector for the title, a second vector for a product (or other entity) description, and so on. A text vector model portion may be created from text by using the Doc2Vec algorithm, for example, or another appropriate algorithm. The text vector model portion created at step 94 may be multi-dimensional, in embodiments. For example, the text vector model portion may have hundreds of dimensions, in some embodiments.

The method 90 may further include a step 96 that includes calculating an image vector model portion. The image vector model portion may be calculated based on one or more images contained in the document, in an embodiment. For example, in an embodiment, the image vector model portion may be calculated based on a primary image contained in the document. For example, in an embodiment, the image vector model portion may be calculated based on the primary image of a product on a product listing page. An image vector model portion may be calculated with a machine learning algorithm, for example, that has been trained to recognize, classify, and reduce to vector form images of a type expected in the document, in an embodiment. For example, in an embodiment, an image vector model may be calculated by inputting a primary image of a product into a machine learning algorithm that has been trained to recognize, classify, and reduce to vector form products of that type. The machine learning algorithm may be, for example, a neural network, such as a convolutional neural network.

The method 90 may further include a step 98 that includes concatenating the model portions to calculate a composite vector model for the document. In an embodiment, the feature vector model portion (calculated at step 92), the image vector model portion (calculated at step 96), and the text model portion (calculated at step 94) may be concatenated or otherwise combined to create the composite vector model. In other embodiments, other combinations of vectors and vector model portions may be concatenated or otherwise combined to create the composite vector model.

Figure 6:
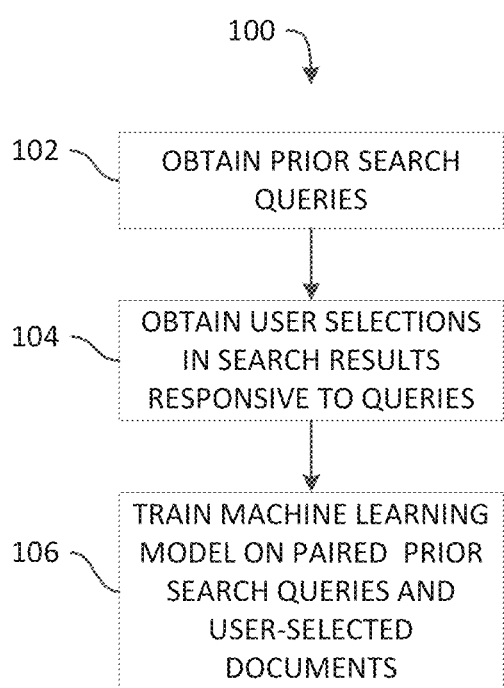
FIG. 6 is a flow chart illustrating an example method of training a machine learning model for converting one or more word vectors into a document vector.

FIG. 6 is a flow chart illustrating an example method 100 of training a machine learning model for converting one or more word vectors into a document vector.

The method 100 may include a step 102 that includes obtaining a set of prior search queries. The prior search queries may have been entered by users for a search engine. The queries in the set of prior search queries may be common search queries for the search engine, in some embodiments. For example, in some embodiments, the search queries included in the set of prior search queries may include each query that has been entered or submitted at least a predetermined number of times (e.g., at least five times, at least ten times, at least twenty-five times, etc.) within a set time frame. Additionally or alternatively, the search queries included in the set of prior search queries may be curated by an administrator of the system. Search queries obtained in step 102 may have been initially stored when entered or submitted by users, and may be obtained from that initial storage, in some embodiments. Additionally or alternatively, search queries obtained in step 102 may be obtained when entered or submitted by users.

The method 100 may further include a step 104 that includes obtaining user selections in search results responsive to the prior search queries obtained in step 102. Obtaining user selections may include obtaining the entire set of search results (or substantial portions thereof) returned by the search engine to each of the prior user search queries obtained in step 102, in some embodiments. Obtaining user selections at step 104 may further include obtaining user selections of one or more documents from within those search results. User selections obtained in step 104 may have been initially stored when made by users, and may be obtained from that initial storage, in some embodiments. Additionally or alternatively, user selections obtained in step 104 may be obtained when made by users. User selections obtained at step 104 may be embodied in user click data collected by a website through which the prior search queries were made, in some embodiments.

The method 100 may further include a step 106 that may include training a machine learning algorithm on paired prior search queries and user selections responsive to those prior search queries. Pairs may include documents selected by users and corresponding search queries, which may comprise positive examples for training the machine learning algorithm. Pairs may further include documents not selected by users (and included in search results obtained at step 1-4) and corresponding search queries, which may comprise negative examples for training the machine learning algorithm. The machine learning algorithm may be, for example, a recurrent neural network, or another neural network type, or another type of machine learning algorithm.

Figure 7:
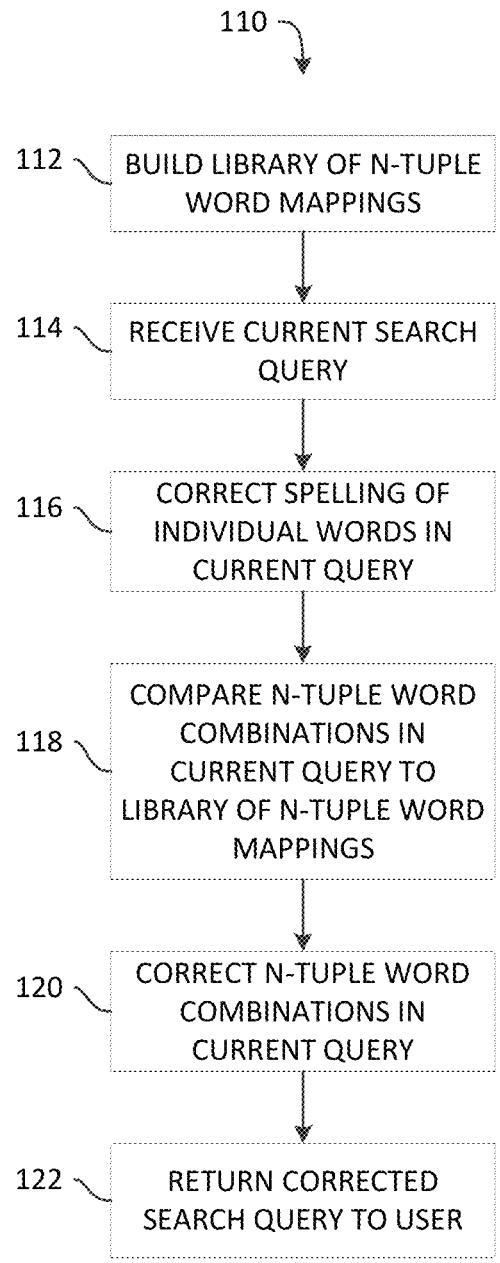
FIG. 7 is a flow chart illustrating an example method for identifying and correcting misspellings in a search query.

FIG. 7 is a flow chart illustrating an example method 110 for identifying and correcting misspellings in a search query. As noted above, the method may find use as step 46 of the method 40 of FIG. 2.

The method 110 may include a step 112 that includes building a library of n-tuple word mappings. The library of n-tuple word mappings may include a plurality of n-tuple word combinations that have been included in prior user searches with a search engine, in some embodiments. The library of n-tuple word mappings may include only word combinations that are known to be properly spelled (and proper combinations of words), in some embodiments. For example, the library of n-tuple word mappings may be curated (e.g., an administrator of the search query suggestion system 14 of FIG. 1) to ensure proper spelling and proper word combinations, in some embodiments.

In some embodiments, the library of n-tuple word mappings may include a plurality of word mappings of a single length, or a plurality of word mappings of numerous lengths. For example, in an embodiment, the library of n-tuple word mappings may comprise or may consist of a plurality of bigrams, each consisting of an ordered combination of two words. In an embodiment, the library of n-tuple word mappings may comprise or may consist of a plurality of trigrams, each consisting of an ordered combination of three words. In other embodiments, the library of n-tuple word mappings may comprise or may consist of a plurality of ordered combinations of another quantity of words (e.g., ordered word combinations of length n).

The method 110 may further include a step 114 that includes receiving a current search query from a user. The receiving a search query step 114 may be substantially the same as the receiving a user search query step 44 described above with reference to the method 40 of FIG. 2.

The method 110 may further include a step 116 that includes correcting spelling of individual words within the current search query. Correcting spelling of individual words within the current search query may include comparing the individual words with a dictionary to, first, determine if any of the words are spelled incorrectly and, second, to correct any individual words that are spelled incorrectly to a word that is included in the dictionary.

The method 110 may further include a step 118 that includes comparing one or more n-tuple word combinations in the current search query to the library of n-tuple word mappings. The n-tuple word mapping step may include comparing each n-tuple word combination in the current search query to the library of n-tuple word mappings to determine if the n-tuple word combination is found in the mappings, in some embodiments. Any n-tuple word combination in the search query that is not found in the mappings may be flagged for correction, in some embodiments. For example, if the search query is "back rubber mallet", and the library of n-tuple word mappings consists of bigrams, the bigrams "back rubber" and "rubber mallet" may be compared to the library. "Back rubber" may not be found in the library, in this example, and thus may be flagged for correction. In contrast, "rubber mallet" may be found in the library, in this example, and may not be flagged for correction.

The method 110 may further include a step that includes correcting one or more n-tuple word combinations in the current search query that are not found in the library of n-tuple word mappings. In some embodiments, correcting an n-tuple word combination may include changing the n-tuple word combination to an n-tuple found in the mappings. Continuing the "back rubber mallet" example above, the bigram "back rubber" may be corrected to "black rubber," which may be included in the library of this example. In other embodiments, correcting an n-tuple word combination may include correction according to a known spell correction methodology that is capable of correcting combinations of words in which each word is individually spelled correctly, such as a bigram/n-gram/skip-gram model with phonetic matching and part-of-speech tagging, for example.

The method 110 may further include a step 122 that may include returning a corrected search query to the user. As described above, the corrected search query may be provided in or adjacent to a search query interface in which the user entered the current search query, and may be provided as a suggestion or as an automatic replacement of the current search query, in some embodiments.

Figure 8:
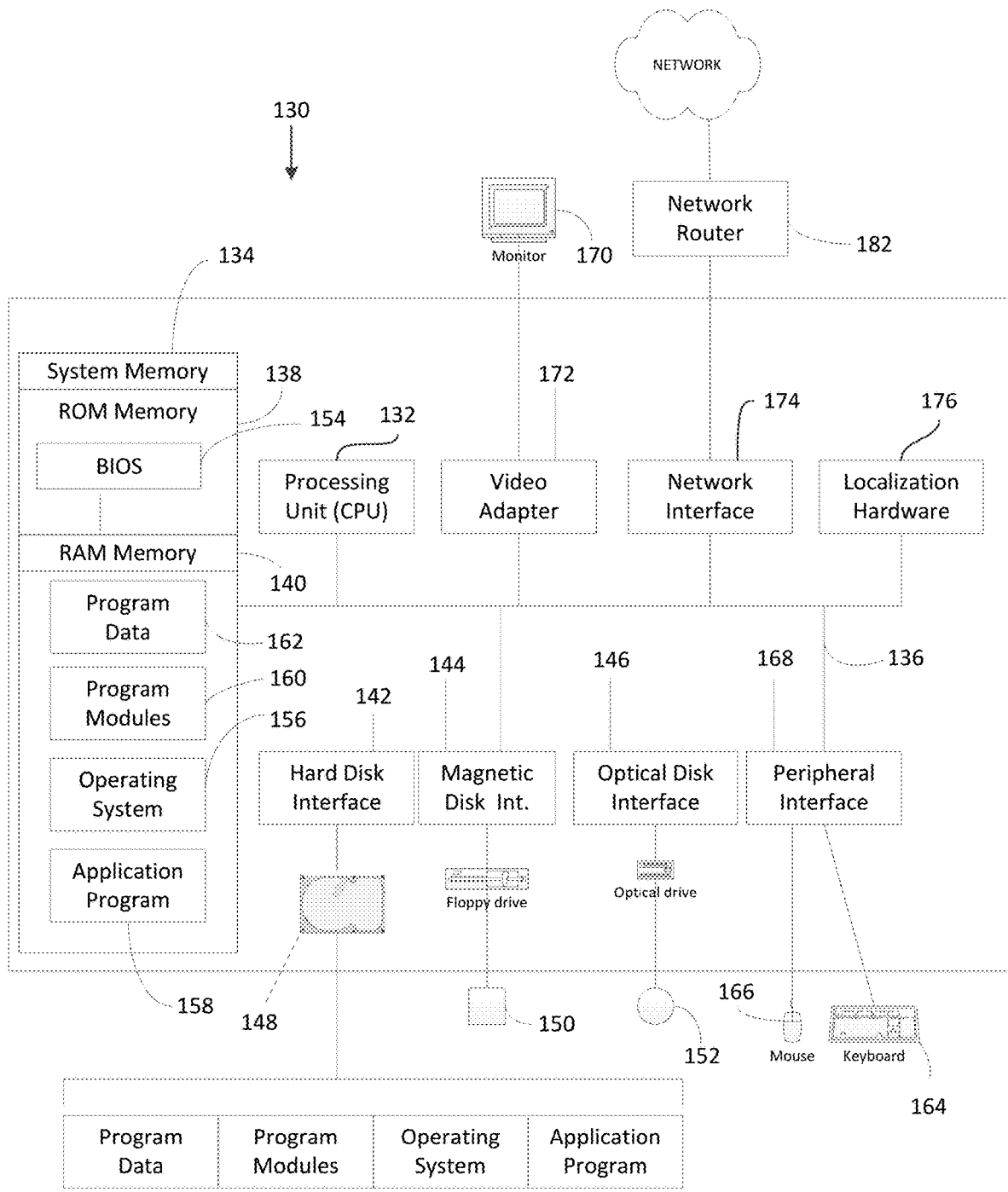
FIG. 8 is a diagrammatic view of an example embodiment of a user computing environment.

FIG. 8 is a diagrammatic view of an illustrative computing system that includes a general purpose computing system environment 130, such as a desktop computer, laptop, smartphone, tablet, or any other such device having the ability to execute instructions, such as those stored within a non-transient, computer-readable medium. Furthermore, while described and illustrated in the context of a single computing system 130, those skilled in the art will also appreciate that the various tasks described hereinafter may be practiced in a distributed environment having multiple computing systems 130 linked via a local or wide-area network in which the executable instructions may be associated with and/or executed by one or more of multiple computing systems 130.

In its most basic configuration, computing system environment 130 typically includes at least one processing unit 132 and at least one memory 134, which may be linked via a bus 136. Depending on the exact configuration and type of computing system environment, memory 134 may be volatile (such as RAM 140), non-volatile (such as ROM 138, flash memory, etc.) or some combination of the two. Computing system environment 130 may have additional features and/or functionality. For example, computing system environment 130 may also include additional storage (removable and/or non-removable) including, but not limited to, magnetic or optical disks, tape drives and/or flash drives. Such additional memory devices may be made accessible to the computing system environment 130 by means of, for example, a hard disk drive interface 142, a magnetic disk drive interface 144, and/or an optical disk drive interface 146. As will be understood, these devices, which would be linked to the system bus 136, respectively, allow for reading from and writing to a hard disk 148, reading from or writing to a removable magnetic disk 150, and/or for reading from or writing to a removable optical disk 152, such as a CD/DVD ROM or other optical media. The drive interfaces and their associated computer-readable media allow for the nonvolatile storage of computer readable instructions, data structures, program modules and other data for the computing system environment 130. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 130.

A number of program modules may be stored in one or more of the memory/media devices. For example, a basic input/output system (BIOS) 154, containing the basic routines that help to transfer information between elements within the computing system environment 150, such as during start-up, may be stored in ROM 138. Similarly, RAM 140, hard drive 148, and/or peripheral memory devices may be used to store computer executable instructions comprising an operating system 156, one or more applications programs 158 (such as the search engine or search result ranking system disclosed herein), other program modules 160, and/or program data 162. Still further, computer-executable instructions may be downloaded to the computing environment 130 as needed, for example, via a network connection.

An end-user may enter commands and information into the computing system environment 130 through input devices such as a keyboard 164 and/or a pointing device 166. While not illustrated, other input devices may include a microphone, a joystick, a game pad, a scanner, etc. These and other input devices would typically be connected to the processing unit 132 by means of a peripheral interface 168 which, in turn, would be coupled to bus 136. Input devices may be directly or indirectly connected to processor 132 via interfaces such as, for example, a parallel port, game port, firewire, or a universal serial bus (USB). To view information from the computing system environment 130, a monitor 170 or other type of display device may also be connected to bus 146 via an interface, such as via video adapter 172. In addition to the monitor 170, the computing system environment 130 may also include other peripheral output devices, not shown, such as speakers and printers.

The computing system environment 130 may also utilize logical connections to one or more computing system environments. Communications between the computing system environment 130 and the remote computing system environment may be exchanged via a further processing device, such a network router 182, that is responsible for network routing. Communications with the network router 182 may be performed via a network interface component 174. Thus, within such a networked environment, e.g., the Internet, World Wide Web, LAN, or other like type of wired or wireless network, it will be appreciated that program modules depicted relative to the computing system environment 130, or portions thereof, may be stored in the memory storage device(s) of the computing system environment 130.

The computing system environment 130 may also include localization hardware 176 for determining a location of the computing system environment 130. In embodiments, the localization hardware 176 may include, for example only, a GPS antenna, an RFID chip or reader, a WiFi antenna, or other computing hardware that may be used to capture or transmit signals that may be used to determine the location of the computing system environment 130.

The computing environment 130, or portions thereof, may comprise one or more of the user computing devices 20 of FIG. 1, in embodiments. Additionally, or alternatively, some or all of the components of the computing environment 130 may comprise embodiments of the search engine 12, the search query suggestion system 14, a database or other store for the documents 16, and/or the server 18, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention. It should be borne in mind, however, that these terms are to be interpreted as referencing physical manipulations and quantities and are merely convenient labels that should be interpreted further in view of terms commonly used in the art.

Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Several methods, processes, and algorithms are set forth herein as comprising one or more "steps." Such steps are not required to be performed in any particular order except as mandated by logic or as specifically set forth in the claims.

What is claimed is:

1. A method of recommending similar searches in an electronic document search engine, the method comprising:
    receiving a current search query from a user, the current search query intended for the search engine;
    converting the current search query into one or more word vectors;
    converting the one or more word vectors into a document vector with a machine learning model, the machine learning model trained on a set of pairs, each pair comprising (i) a respective prior search query, each comprising one or more word vectors, and (ii) a composite vector describing a respective document that is searchable by the search engine and is responsive to the respective prior search query;
    applying a locality-sensitive hashing algorithm to the document vector to determine one or more of the composite vectors that are closest to the document vector;
    determining prior search queries to which the one or more of the composite vectors that are closest to the document vector were responsive; and
    recommending to the user, responsive to the current search query, the prior search queries to which the one or more of the composite vectors that are closest composite vectors are responsive.

2. The method of claim 1, wherein the machine learning model is a recurrent neural network.

3. The method of claim 1, wherein the set of pairs is based on user data in the search engine, wherein each pair comprises (i) a respective prior search query input by a user in the search engine and (ii) a respective composite vector describing a respective document that was returned by the search engine and selected by the user responsive to the respective prior search query.

4. The method of claim 1, wherein:
    the search query is received through a search interface for the search engine; and
    recommending the prior search queries comprises recommending the prior search queries in or near the search interface.

5. The method of claim 1, wherein each composite vector comprises:
    a feature vector model portion based on one or more features of an entity that are included in the respective document;
    a description vector model portion calculated based on a narrative description of the entity that is included in the respective document; and
    an image vector model portion based on an image of the entity that is included in the respective document.

6. The method of claim 1, further comprising:
    determining that the current search query includes a spelling error; and
    determining a corrected current search query by correcting the spelling error;
    wherein converting the current search query into one or more word vectors comprises converting the corrected current search query into one or more word vectors.

7. The method of claim 6, wherein determining that the current search query includes a spelling error comprises comparing the current search query to a library of n-tuple word mappings.

8. The method of claim 7, wherein:
    the prior search queries included in the set of pairs comprises a first set of prior search queries; and
    the library of n-tuple word mappings comprises a second set of prior search queries comprising a plurality of properly-spelled search queries.

9. The method of claim 1, further comprising training the machine learning model on the set of pairs.

10. The method of claim 1, further comprising:
    receiving, from the user, a selection of one of the prior search queries;
    executing a search with the search engine on the user-selected prior search query; and
    returning a set of documents to the user that are responsive to the user-selected prior search query.

11. A system comprising:
    a processor; and
    a memory storing instructions that, when executed by the processor, cause the system to perform a method comprising:
        receiving a current search query from a user, the current search query intended for a search engine;
        converting the current search query into one or more word vectors;
        converting the one or more word vectors into a document vector with a machine learning model, the machine learning model trained on a set of pairs, each pair comprising (i) a respective prior search query, each comprising one or more word vectors, and (ii) a composite vector describing a respective document that is searchable by the search engine and is responsive to the respective prior search query;
        applying a locality-sensitive hashing algorithm to the document vector to determine one or more of the composite vectors that are closest to the document vector;
        determining prior search queries to which the one or more of the composite vectors that are closest to the document vector were responsive; and
        recommending to the user, responsive to the current search query, the prior search queries to which the one or more of the composite vectors that are closest composite vectors are responsive.

12. The system of claim 11, wherein the machine learning model is a recurrent neural network.

13. The system of claim 11, wherein the set of pairs is based on user data in the search engine, wherein each pair comprises (i) a respective prior search query input by a user in the search engine and (ii) a respective composite vector describing a respective document that was returned by the search engine and selected by the user responsive to the respective prior search query.

14. The system of claim 11, wherein:
the search query is received through a search interface for the search engine; and
recommending the prior search queries comprises recommending the prior search queries in or near the search interface.

15. The system of claim 11, wherein each composite vector comprises:
a feature vector model portion based on one or more features of an entity that are included in the respective document;
a description vector model portion calculated based on a narrative description of the entity that is included in the respective document; and
an image vector model portion based on an image of the entity that is included in the respective document.

16. The system of claim 11, wherein the method further comprises:
determining that the current search query includes a spelling error; and
determining a corrected current search query by correcting the spelling error;
wherein converting the current search query into one or more word vectors comprises converting the corrected current search query into one or more word vectors.

17. The system of claim 16, wherein determining that the current search query includes a spelling error comprises comparing the current search query to a library of n-tuple word mappings.

18. The system of claim 17, wherein:
the prior search queries included in the set of pairs comprises a first set of prior search queries; and
the library of n-tuple word mappings comprises a second set of prior search queries comprising a plurality of properly-spelled search queries.

19. The system of claim 11, wherein the method further comprises training the machine learning model on the set of pairs.

20. The system of claim 11, wherein the method further comprises:
receiving, from the user, a selection of one of the prior search queries;
executing a search with the search engine on the user-selected prior search query; and
returning a set of documents to the user that are responsive to the user-selected prior search query.

* * * * *